(12) United States Patent
Chen

(10) Patent No.: US 11,579,012 B1
(45) Date of Patent: Feb. 14, 2023

(54) ABNORMAL SOUND DETECTION METHOD AND APPARATUS

(71) Applicant: Wistron Corporation, New Taipei (TW)

(72) Inventor: Tairong Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/460,338

(22) Filed: Aug. 30, 2021

(30) Foreign Application Priority Data

Jul. 13, 2021 (TW) ................... 110125758

(51) Int. Cl.
*G01H 17/00* (2006.01)
(52) U.S. Cl.
CPC .................. *G01H 17/00* (2013.01)
(58) Field of Classification Search
None
See application file for complete search history.

(56) References Cited

U.S. PATENT DOCUMENTS

| | | | | |
|---|---|---|---|---|
| 6,434,515 B1* | 8/2002 | Qian | ............ | G06F 17/141 |
| | | | | 324/76.12 |
| 6,486,678 B1* | 11/2002 | Spears | ............ | G01N 29/46 |
| | | | | 324/555 |
| 8,175,829 B2* | 5/2012 | Afgani | ............ | G01R 23/20 |
| | | | | 708/200 |
| 2013/0182865 A1* | 7/2013 | Paul | ............ | G10K 11/17881 |
| | | | | 381/71.8 |
| 2020/0209842 A1* | 7/2020 | Koizumi | ............ | G05B 23/0254 |

FOREIGN PATENT DOCUMENTS

| | | |
|---|---|---|
| CN | 101846594 | 9/2010 |
| CN | 106017954 | 10/2016 |
| CN | 103810374 | 4/2017 |
| CN | 106323452 | 3/2019 |
| CN | 111968670 | 11/2020 |
| TW | I287216 | 9/2007 |
| TW | I448978 | 8/2014 |

OTHER PUBLICATIONS

"Office Action of Taiwan Counterpart Application", dated Feb. 23, 2022, p. 1-p. 9.

* cited by examiner

*Primary Examiner* — Raul J Rios Russo
*Assistant Examiner* — Carl F. R. Tchatchouang
(74) *Attorney, Agent, or Firm* — JCIPRNET

(57) ABSTRACT

An abnormal sound detection method and apparatus are provided. First, an abnormal sound signal is received. Next, the abnormal sound signal is converted into a spectrogram. Afterwards, image recognition is performed on the spectrogram for obtaining a defect category corresponding to the abnormal sound signal.

16 Claims, 3 Drawing Sheets

ABNORMAL SOUND DETECTION METHOD AND APPARATUS

CROSS-REFERENCE TO RELATED APPLICATION

This application claims the priority benefit of Taiwan application serial no. 110125758, filed on Jul. 13, 2021. The entirety of the above-mentioned patent application is hereby incorporated by reference herein and made a part of this specification.

BACKGROUND

Technical Field

The disclosure relates to a sound detection technology, and more particularly to an abnormal sound detection method and apparatus.

Description of Related Art

Generally speaking, problems such as assembly defects adversely affect performance of sound-related electronic products such as speakers or microphones. For example, assembly defects may lead to electrical noise or mechanical abnormal sounds or vibrations. Assembly defects are usually detected by experienced listeners at the ends of production lines, and such detection requires the application of log-swept sine chirps to speakers and the use of human auditory detection to analyze whether response signals thereof are normal. However, results detected by human hearing evaluation vary with subjective factors such as the listeners' age, mood changes, and hearing fatigue, and this method is likely to cause occupational injuries to the listeners.

In addition, existing models only determine whether an abnormal sound signal exists, without classifying the abnormal sound signal. Therefore, defects of a target remain unknown, which leads to a significant increase in repair time.

SUMMARY

The disclosure provides an abnormal sound detection method and apparatus, which may detect a defect category corresponding to an abnormal sound signal by image recognition.

The abnormal sound detection method of the disclosure includes receiving an abnormal sound signal, converting the abnormal sound signal into a spectrogram, and executing image recognition on the spectrogram for obtaining a defect category corresponding to the abnormal sound signal.

In an embodiment of the disclosure, the step of executing the image recognition on the spectrogram includes inputting the spectrogram to a classification model, which is a neural network model, to obtain multiple probability values respectively corresponding to multiple specified labels, and using the specified label in correspondence with the greatest one among the probability values as the defect category.

In an embodiment of the disclosure, after obtaining the defect category corresponding to the abnormal sound signal, the method further includes determining whether the defect category is consistent with a comparison result, and inputting the abnormal sound signal to a training dataset for retraining the classification model through the training dataset if the defect category is not consistent with the comparison result.

In an embodiment of the disclosure, after obtaining the probability values respectively corresponding to the specified labels, the method further includes the following steps. Whether the greatest one among the probability values is greater than a confidence index corresponding thereto is determined. The specified label in correspondence with the greatest one among the probability values is used as the defect category in response to the greatest one among the probability values being greater than the confidence index corresponding thereto. The abnormal sound signal is input to a training dataset for retraining the classification model through the training dataset in response to the greatest one among the plurality of probability values not being greater than the confidence index corresponding thereto.

In an embodiment of the disclosure, the step of inputting the spectrogram to the classification model includes dividing the spectrogram into multiple sub-spectrograms according to time sequence of the spectrogram for inputting the sub-spectrograms to the classification model.

In an embodiment of the disclosure, the classification model includes a bidirectional long short-term memory (BLSTM) layer, a max pooling layer, a flatten layer, and a fully connected layer.

In an embodiment of the disclosure, the step of converting the abnormal sound signal into the spectrogram includes executing fast Fourier transform on the abnormal sound signal for generating the spectrogram.

In an embodiment of the disclosure, the step of receiving the abnormal sound signal includes receiving the abnormal sound signal from a sound detection model. The sound detection model is for detecting whether an audio signal has an abnormal sound, and regards the audio signal to be the abnormal sound signal when determining that the audio signal has the abnormal sound.

In an embodiment of the disclosure, before receiving the abnormal sound signal from the sound detection model, the method further includes receiving an audio signal from a recording device through the sound detection model. The recording device is disposed on a target in a silent box or is disposed in the silent box for recording a sound emitted in the silent box to output the audio signal.

The abnormal sound detection apparatus of the disclosure includes a receiver, which is configured to receive an abnormal sound signal, and a processor, which is coupled to the receiver and is configured to convert the abnormal sound signal into a spectrogram and execute image recognition on the spectrogram for obtaining a defect category corresponding to the abnormal sound signal.

Based on the above, the disclosure establishes an abnormal sound detection architecture based on deep learning (DL) and classifies abnormal sound signals of various malfunctions through this architecture, thereby reducing the number of machines returned for re-tests and providing relevant information for reference when repairing machines to speed up the repair progress.

DESCRIPTION OF THE EMBODIMENTS

Figure 1:
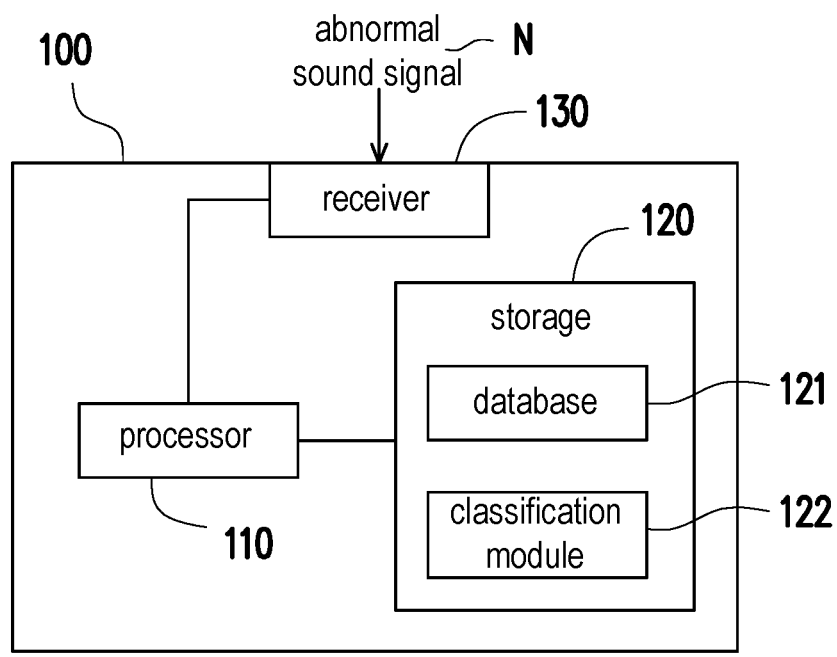
FIG. 1 is a block diagram of an abnormal sound detection apparatus according to an embodiment of the disclosure.

Part of the embodiments of the disclosure will be described in detail below with accompanying drawings. For the reference numerals used in the following description, the same reference numerals appearing in different drawings will be regarded as the same or similar elements. These embodiments are only a part of the disclosure and do not disclose all possible implementations of the disclosure. More precisely, these embodiments only serve as examples of the method and apparatus within the scope of the claims of the disclosure.

FIG. 1 is a block diagram of an abnormal sound detection apparatus according to an embodiment of the disclosure. With reference to FIG. 1, an abnormal sound detection apparatus 100 includes a processor 110, a storage 120, and a receiver 130. The processor 110 is coupled to the storage 120 and the receiver 130. The abnormal sound detection apparatus 100 is for analyzing an abnormal sound signal N which is received, so as to obtain a defect category corresponding to the abnormal sound signal N. In an embodiment, a sound detection model may be disposed in the abnormal sound detection apparatus 100. The sound detection model is a software or a module for determining whether an audio signal is normal or abnormal, and the audio signal determined to be abnormal is the abnormal sound signal.

The storage 120 includes a database 121 and a classification model 122. The database 121 stores a training dataset. The training dataset includes abnormal sound signals of multiple known defect categories collected in advance (serving as a comparison result). These known abnormal sound signals are used to train the classification model 122. Here, the classification model 122 is, for example, a neural network (NN) model including multiple layers, and this NN model is trained through deep learning. The concept of deep learning is to inform the NN model of input-output relationships through a great amount of known data, thereby adjusting parameters such as weight, bias, and the like in the NN model.

The processing unit 110 is, for example, a central processing unit (CPU), a graphics processing unit (GPU), or other programmable microprocessors, a digital signal processor (DSP), a programmable controller, an application specific integrated circuit (ASIC), a programmable logic device (PLD), or other similar apparatuses.

The storage 120 is, for example, any type of fixed or mobile random access memory, read-only memory, flash memory, secure digital card, hard disk, or other similar apparatuses or a combination thereof. The storage 120 stores multiple program code fragments, and the program code fragments are executed by the processor 110 after installed for executing the abnormal sound detection method.

The receiver 130 is, for example, a communication port for being connected to a network card interface, a transmission line, or the like to receive the abnormal sound signal N.

Figure 2:
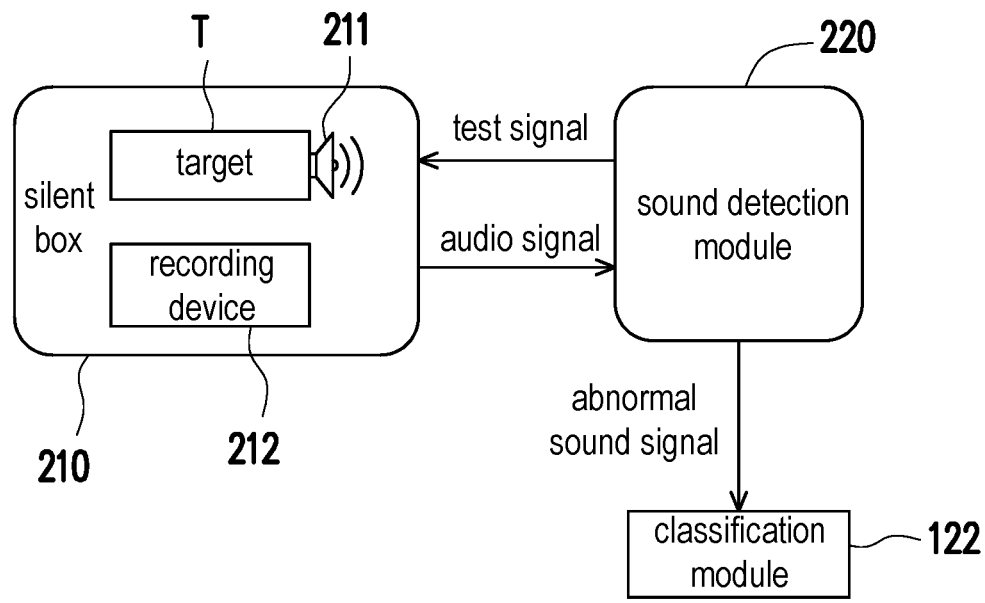
FIG. 2 is a schematic diagram of a system for detecting a target according to an embodiment of the disclosure.

FIG. 2 is a schematic diagram of a system for detecting a target according to an embodiment of the disclosure. With reference to FIG. 2, this system includes a silent box 210, a sound detection model 220, and the classification model 122. In an embodiment, the sound detection model 220 may be disposed in the abnormal sound detection apparatus 100. In other embodiments, the sound detection model 220 may be disposed in an apparatus different from the abnormal sound detection apparatus 100. A target T, a speaker 211 (for example, a loudspeaker), and a recording device 212 (for example, a microphone) are disposed in the silent box 210. The sound detection model 220 receives an audio signal from the recording device 212 and determines whether the audio signal is normal or abnormal, and the audio signal determined to be abnormal is the abnormal sound signal. The recording device 212 is for recording sound emitted in the silent box 210 to output the audio signal.

The target T is placed in the silent box 210 for testing, which may avoid environmental interference. The silent box 210, for example, may perform transmission with the sound detection model 220 through a wired or wireless transmission method. For example, the sound detection model 220 transmits a test signal to the speaker 211 of the silent box 210 through a wired or wireless transmission method for playing the test signal by the speaker 211, and records the sound emitted from the silent box 210 by the recording device 212 of the silent box 210 for outputting the audio signal.

In the embodiment shown in FIG. 2, the recording device 212 is disposed in the silent box 210 (the recording device 212 is not disposed on the target T), and the target T disposed with the speaker 211 is placed in the silent box 210. The target T may be detected through the following method: detecting overall stability of the speaker 211 on the target T and whether vibration of the speaker 211 affects resonance of a housing or elements of the test target T and generates noise. Specifically, the sound detection model 220 outputs the test signal to the speaker 211 disposed on the target T through wireless or wired transmission method so that the speaker 211 plays the test signal (sweep signal) of a specific frequency range. The specific frequency range is generally set within 20 Hz to 20 kHz for scanning the resonance of the target T in this frequency range.

Afterwards, the recording device 212 in the silent box 210 receives (records) the sound emitted in the silent box 210, including the sound emitted by the speaker 211 on the target T as well as the sweep and resonance sound emitted by the test target T. The audio signal recorded by the recording device 212 is transmitted to the sound detection model 220 through a wired or wireless transmission method for the sound detection model 220 to determine whether the audio signal has the abnormal sound. If the audio signal has the abnormal sound, the audio signal is regarded as the abnormal sound signal and classified by the classification model 122. In this way, the abnormal sound signal may be classified according to factors such as which component or structure causes the speaker 211 to generate resonance abnormal sound when playing a sweep signal.

In addition, in other embodiments, the speaker 211 is disposed in the silent box 210 (the speaker 211 is not disposed on the target T), and the target T disposed with the recording device 212 is placed in the silent box 210. The target T may be detected through the following method: detecting receipt stability of the recording device 212 on the target T. That is, the speaker 211 (for example, an artificial mouth) disposed in the silent box 210 emits a test signal (sweep sound), and the recording device 212 on the target T receives (records) the sound emitted in the silent box 210 for outputting an audio signal. Next, the recorded audio signal is transmitted to the sound detection model 220 by a wireless or wired transmission method for the sound detection model 220 to determine whether the audio signal has abnormal sound.

Figure 3:
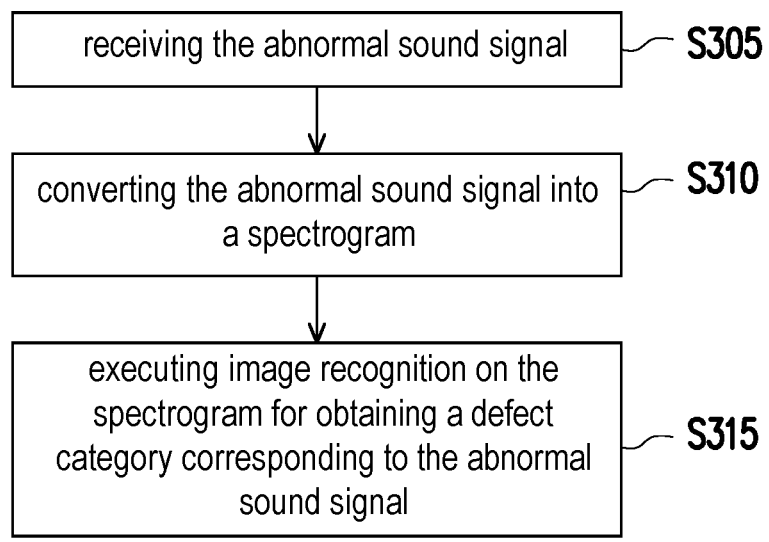
FIG. 3 is a flowchart of an abnormal sound detection method according to an embodiment of the disclosure.

FIG. 3 is a flowchart of an abnormal sound detection method according to an embodiment of the disclosure. With reference to FIG. 1 to FIG. 3, in step S305, the processor 110 receives the abnormal sound signal N through the receiver 130.

Next, in step S310, the processor 110 converts the abnormal sound signal into a spectrogram. Here, the processor 110 executes fast Fourier transform (FFT) on the abnormal sound signal N to generate the spectrogram. The reason why the abnormal sound signal N is converted to the spectrogram is that the abnormal sound and the test signal have time continuity during resonance. Therefore, converting time domain signals to the spectrogram allows abnormal sound features to show a phenomenon of time continuity and energy clustering in the spectrogram, retaining subtle features without losing these subtle features during conversion, so as to facilitate subsequent defect detection of the test target T by using computer vision technologies.

There are many factors for generating an abnormal sound, such as "short circuits due to solder bridging of elements", "flex cables disposed too tight", "not equipped with foam gaskets", "poor quality of imported materials". Among the above, the factor of "short circuits due to solder bridging of elements" refers to the problem that the speaker 211 generates a direct current sound or is muted. The factor of "flex cables disposed too tight" refers to the fact that the recording device 212 is suspended on the housing (the target T), so the cables may pull the suspended recording device 212 if the cables are too short, resulting in poor sound reception or noise generation. The factor of "not equipped with foam gaskets" causes a loudspeaker to vibrate and affect the housing of the target T, resulting in a vibrating sound due to resonance of the housing. The factor of "poor quality of imported materials" refers to poor quality of the speaker 211. In addition, when a foreign body (such as a plastic bag) exists on the target T, the resonance sound of the foreign body also causes abnormal sound generation.

Figure 4A:
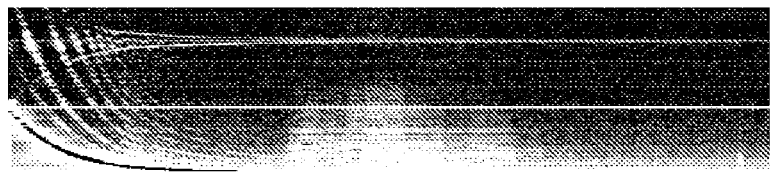
FIG. 4A and FIG. 4B are schematic diagrams of abnormal sound signal spectrograms according to an embodiment of the disclosure.
Figure 4B:
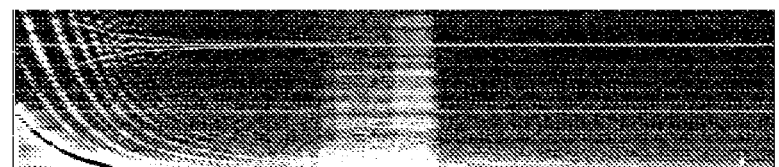

Generally speaking, the resonance of the target T in the specific frequency range generates harmonic features in the spectrogram. If an abnormal sound appears, harmonics in the spectrogram will cluster together and present a block of high brightness. The more severe the abnormal sound is, the greater and/or the brighter the block is, while the less severe the abnormal sound is, the smaller and/or the less bright the block is. FIG. 4A and FIG. 4B are schematic diagrams of abnormal sound signal spectrograms according to an embodiment of the disclosure. In the spectrogram shown in FIG. 4A and FIG. 4B, the horizontal axis represents frequency, and the vertical axis represents power ratio. FIG. 4A and FIG. 4B show the spectrograms of abnormal sound signals caused by different defect categories.

Afterwards, in step S315, image recognition is executed on the spectrogram through the classification model 122 for obtaining the defect category corresponding to the abnormal sound signal N. That is, the spectrogram is input to the classification model 122 for obtaining multiple probability values respectively corresponding to multiple specified labels. In addition, the specified label in correspondence with the greatest one among the probability values is used as the defect category. For example, in a stage of training the classification model 122, if there are six types of known defect categories included in the training dataset, then six specified labels are finally output by the classification model 122. In a stage of detection, the classification model 122 may be used to obtain six probability values corresponding to the six specified labels. The sum of the six probability values is 1. The highest probability value among the six probability values is selected, and the specified label corresponding to this highest probability value is the finally obtained defect category.

The classification model 122 may further include a human hearing weight to adjust the probability value corresponding to the output specified label so that an output result is closer to a determination result of a human ear.

In addition, in order to further verify the classification model 122, during transmitting the abnormal sound signal N to the classification model 122 for classification, the abnormal sound signal N is also provided to a relevant engineer for manual classification to obtain a comparison result. Therefore, the defect category obtained from the classification model 122 may be compared with the comparison result. If the two do not match, this abnormal sound signal N and the comparison result are input to the training dataset for retraining the classification model 122 through the training dataset.

In addition, a confidence index corresponding to each specified label may also be set. After obtaining the highest probability value, the highest probability value is further compared with the confidence index corresponding thereto. If the highest probability value is not greater than the confidence index corresponding thereto, it means that the defect category corresponding thereto is not one of the existing six labels. Therefore, the abnormal sound signal N is transmitted to the relevant engineer for manual identification to obtain the defect category corresponding to the abnormal sound signal N, and the abnormal sound signal N and the defect category corresponding thereto (not yet in the training dataset) are added (input) to the training dataset to retrain the classification model 122.

Figure 5:
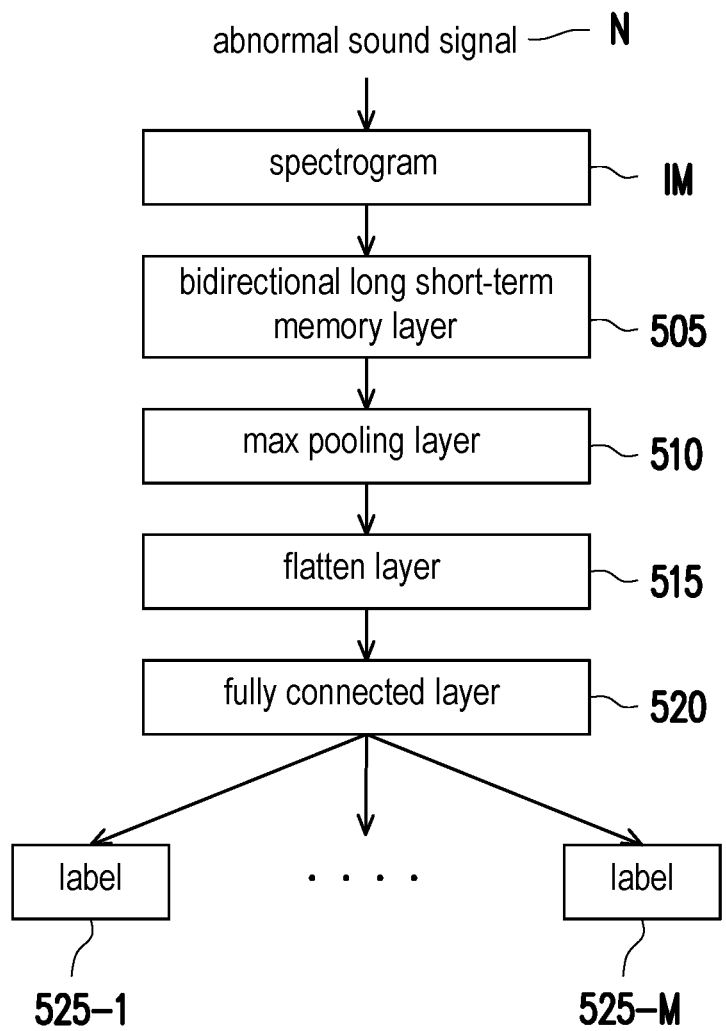
FIG. 5 is an architecture diagram of a classification model according to an embodiment of the disclosure.

FIG. 5 is an architecture diagram of a classification model according to an embodiment of the disclosure. With reference to FIG. 5, the classification model 122 includes a bidirectional long short-term memory (BLSTM) layer 505, a max pooling layer 510, a flatten layer 515, and a fully connected layer 520.

After receiving the abnormal sound signal N, the processor 110 converts the abnormal sound signal N into a spectrogram IM. Next, according to time sequence of the spectrogram IM, the spectrogram IM is divided into multiple sub-spectrograms. For example, the spectrogram IM is divided into multiple sub-spectrograms $f_1$ to $f_T$ from low frequency to high frequency, and these sub-spectrograms $f_1$ to $f_T$ are input to the BLSTM layer 505.

The BLSTM layer 505 obtains feature data according to the following equations:

$$\vec{h}_t = \text{LSTM}(f_t, \vec{h}_{t-1})$$

$$\overleftarrow{h}_t = \text{LSTM}(f_t, \overleftarrow{h}_{t+1})$$

$$h_t^{blstm} = \vec{h}_t + \overleftarrow{h}_t$$

The BLSTM layer 505 respectively uses two long short-term memory (LSTM) models to do forward pass and backward pass calculations on sub-spectrograms $f_t$ (t=1 to T) for obtaining feature data $\vec{h}_t$ and feature data $\overleftarrow{h}_t$, and then obtains feature data $h_t^{blstm}$ based on the feature data $\vec{h}_t$ and the feature data $\overleftarrow{h}_t$.

Afterwards, the features data $h_t^{blstm}$ retrieved on the BLSTM layer 505 is simplified through the max pooling layer 510 to obtain more important feature information. The max pooling layer 510 calculates an output on each pooling window, and then selects the max value according to values in the pooling windows. The max pooling layer 510 is calculated according to the following equation:

$$f_t(S)=\text{MAX}(h_t^{blstm})$$

The flatten layer 515 is for flattening the feature data output by the max pooling layer 510. For example, multi-dimensional feature data is transformed into a one-dimensional matrix. Finally, the flattened feature data is input to the fully connected layer 520, and after weight calculations, the probability values corresponding to multiple labels 525-1 to 525-M are obtained in the spectrogram IM. Here, the sum of the probability values of the labels 525-1 to 525-M is 1. Here, the labels 525-1 to 525-M respectively have confidence indexes T1 to TM corresponding thereto. After the probability values of the labels 525-1 to 525-M are obtained, the highest probability value is taken out. Assuming that the label 525-1 has the highest probability value, it is further determined whether the probability value of the label 525-1 is higher than the confidence index T1 corresponding thereto. If the probability value of the label 525-1 is higher than the confidence index T1 corresponding thereto, then the defect category of the abnormal sound signal N is the label 525-1. If the probability value of the label 525-1 is not higher than the confidence index T1 corresponding thereto, then the abnormal sound signal N is sent to the relevant engineer for manual identification to obtain the defect category in correspondence with the abnormal sound signal N, and this abnormal sound signal N along with the corresponding defect category (not yet in the training dataset) are added (input) to the training dataset to retrain the classification model 122.

In summary, the abnormal sound signal classification in the above embodiments may shorten repair time, provide more accurate defect detection than subjective determination by a human ear, and reduce relevant occupational injuries. In addition, the abnormal sound signal may directly be analyzed through the classification model to know which type of failures causes the abnormal sound signal. In this way, a device that did not pass a test may be repaired at one time, and after analysis, elements and mechanisms that often fail may be known for improvements to increase the yield.

What is claimed is:

1. An abnormal sound detection method, comprising:
    receiving an abnormal sound signal;
    converting the abnormal sound signal into a spectrogram; and
    executing image recognition on the spectrogram for obtaining a defect category corresponding to the abnormal sound signal,
    wherein executing the image recognition on the spectrogram comprises:
    inputting the spectrogram to a classification model for obtaining a plurality of probability values respectively corresponding to a plurality of specified labels, wherein the classification model is a neural network model; and
    using the specified label in correspondence with a greatest one among the plurality of probability values as the defect category.

2. The abnormal sound detection method according to claim 1, after obtaining the defect category in correspondence with the abnormal sound signal, further comprising:
    determining whether the defect category is consistent with a comparison result; and
    inputting the abnormal sound signal to a training dataset for retraining the classification model through the training dataset in response to the defect category is not consistent with the comparison result.

3. The abnormal sound detection method according to claim 1, after obtaining the plurality of probability values respectively corresponding to the plurality of specified labels, further comprising:
    determining whether the greatest one among the plurality of probability values is greater than a confidence index;
    using the specified label in correspondence with the greatest one among the plurality of probability values as the defect category in response to the greatest one among the plurality of probability values being greater than the confidence index; and
    inputting the abnormal sound signal to a training dataset for retraining the classification model through the training dataset in response to the greatest one among the plurality of probability values not being greater than the confidence index.

4. The abnormal sound detection method according to claim 1, wherein a step of inputting the spectrogram to the classification model comprises:
    dividing the spectrogram into a plurality of sub-spectrograms according to time sequence of the spectrogram for inputting the plurality of sub-spectrograms to the classification model.

5. The abnormal sound detection method according to claim 1, wherein the classification model comprises a bidirectional long short-term memory layer, a max pooling layer, a flatten layer, and a fully connected layer.

6. The abnormal sound detection method according to claim 1, wherein a step of converting the abnormal sound signal into the spectrogram comprises:
    executing fast Fourier transform on the abnormal sound signal for generating the spectrogram.

7. The abnormal sound detection method according to claim 1, wherein a step of receiving the abnormal sound signal comprises:
    receiving the abnormal sound signal from a sound detection model,
    wherein the sound detection model is for detecting whether an audio signal has an abnormal sound, and regards the audio signal to be the abnormal sound signal in response to determining that the audio signal has the abnormal sound.

8. The abnormal sound detection method according to claim 7, before a step of receiving the abnormal sound signal from the sound detection model, further comprising:
    receiving the audio signal from a recording device through the sound detection model,
    wherein the recording device is disposed on a target in a silent box or is disposed in the silent box for recording a sound emitted in the silent box to output the audio signal.

9. An abnormal sound detection apparatus, comprising:
    a receiver, configured to receive an abnormal sound signal; and
    a processor, coupled to the receiver, and configured to: convert the abnormal sound signal into a spectrogram, and execute an image recognition on the spectrogram through a classification model for obtaining a defect category corresponding to the abnormal sound signal,
    wherein the processor is configured to: input the spectrogram to the classification model for obtaining a plurality of probability values respectively corresponding to a plurality of specified labels, wherein the classification model is a neural network model; and use the specified label in correspondence with a greatest one among the plurality of probability values as the defect category.

10. The abnormal sound detection apparatus according to claim 9, wherein the processor is configured to:
  determine whether the defect category is consistent with a comparison result;
  input the abnormal sound signal to a training dataset for retraining the classification model through the training dataset in response to the defect category is not consistent with the comparison result.

11. The abnormal sound detection apparatus according to claim 9, wherein the processor is configured to:
  determine whether the greatest one among the plurality of probability values is greater than a confidence index;
  use the specified label in correspondence with the greatest one among the plurality of probability values as the defect category in response to the greatest one among the plurality of probability values being greater than the confidence index; and
  input the abnormal sound signal to a training dataset for retraining the classification model through the training dataset in response to the greatest one among the plurality of probability values not being greater than the confidence index.

12. The abnormal sound detection apparatus according to claim 9, wherein the processor is configured to:
  divide the spectrogram into a plurality of sub-spectrograms according to time sequence of the spectrogram for inputting the plurality of sub-spectrograms to the classification model.

13. The abnormal sound detection apparatus according to claim 9, wherein the classification model comprises a bidirectional long short-term memory layer, a max pooling layer, a flatten layer, and a fully connected layer.

14. The abnormal sound detection apparatus according to claim 9, wherein the processor is configured to:
  execute fast Fourier transform on the abnormal sound signal for generating the spectrogram.

15. The abnormal sound detection apparatus according to claim 9, wherein the receiver is configured to:
  receive the abnormal sound signal from a sound detection model,
  wherein the sound detection model is for detecting whether an audio signal has an abnormal sound, and regards the audio signal to be the abnormal sound signal in response to determining that the audio signal has the abnormal sound.

16. The abnormal sound detection apparatus according to claim 15, further comprising:
  the sound detection model, receiving the audio signal from a recording device,
  wherein the recording device is disposed on a target in a silent box or is disposed in the silent box for recording a sound emitted in the silent box to output the audio signal.

* * * * *